United States Patent [19]
Shimada

[11] Patent Number: 6,141,668
[45] Date of Patent: Oct. 31, 2000

[54] PSEUDO-RANDOM NUMBER GENERATING METHOD AND APPARATUS THEREFOR

[75] Inventor: Michio Shimada, Tokyo, Japan

[73] Assignee: NEC Corporation, Tokyo, Japan

[21] Appl. No.: 09/166,798

[22] Filed: Oct. 6, 1998

[30] Foreign Application Priority Data

Oct. 6, 1997 [JP] Japan .................................... 9-290350

[51] Int. Cl.[7] .................................................... G06F 1/02
[52] U.S. Cl. ............................................................ 708/250
[58] Field of Search ................................. 708/250–256; 380/46

[56] References Cited

U.S. PATENT DOCUMENTS

| | | | |
|---|---|---|---|
| 3,780,275 | 12/1973 | Nakamura | 708/250 |
| 3,838,259 | 9/1974 | Kortenhaus | 708/250 |
| 5,031,129 | 7/1991 | Powell et al. | 708/253 |
| 5,864,491 | 1/1999 | Smeets | 708/250 |

*Primary Examiner*—Tan V. Mai
*Attorney, Agent, or Firm*—Sughrue, Mion, Zinn, Macpeak & Seas, PLLC

[57] ABSTRACT

A generator 101 produces randomly an integer $A_1$ which satisfies $0 \leq A < (P_1-1)(P_2-1) \ldots (P_m-1)$, in synchronism With a clock pulse applied via an input terminal 180, where each of $P_1, P_2, \ldots P_m$ is a prime number equal to or more than 2. First calculating means 4 calculates an integer X, whose probability of being a prime number is high, using the integer A based on equation $X = a_1(P_1P_2 \ldots P_m/P_1)B_1 + a_2(P_1P_2 \ldots P_m/P_2)B_2 + a_m(P_1P_2 \ldots P_m/P_m)B_m \pmod{P_1P_2 \ldots P_m}$. In this case, $a_k$ ($k=1, 2, \ldots, m$) is an integer which satisfies congruence equation $a_k(P_1P_2 \ldots P_m/P_k) = 1 \pmod{P_k}$, while $B_k$ represents $\{A \bmod (P_k-1)\} + 1$. An adder 107 outputs the integer X as an integer with a predetermined number of bits.

10 Claims, 4 Drawing Sheets

PSEUDO-RANDOM NUMBER GENERATING METHOD AND APPARATUS THEREFOR

BACKGROUND OF THE INVENTION

1. Field of the Invention

The present invention relates to a method of generating pseudo-random-numbers and an apparatus therefor.

2. Description of the Related Art

In order to prevent a third party from eavesdropping information transmitted via a communications system such as telephones, modems, televisions, etc., it is known in the art to encipher the information to be transmitted by adding pseudo-random-numbers to the information using a logic function of exclusive-or.

Two cryptographic techniques are known in the art: one is conventional cryptography wherein an identical key is used for both encipherment and decipherment, and the other is public-key cryptography in which different keys are utilized for encipherment and decipherment. Among these, with the pubic-key cryptosystem, it is no longer required to previously deliver a key before data transmission thereby to be capable of saving time, and further, it is easy to keep or manage the key because the keeping of key is done at a receiver side.

In accordance with the public-key cryptography, the receiver side deciphers the information using a secret key that is typically a prime number whose digits ranges from several hundreds to several thousands of bits. Therefore, it is important how to efficiently generate such a large prime number at random.

There is no formula for generating such a prime number. Accordingly, when generating a prime number with a predetermined number of bits, an integer with the predetermined number of bits is generated at random, after which a check is made to determine if the integer is a prime number. These operations are iterated until a prime number is obtained. However, a lot of calculations are necessary to decide whether or not the number is a prime one and thus, in order to overcome this problem, a conventional technique does not generate at random the integers each having the predetermined bits. That is, in order to same a time, an integer, which exhibits a higher possibility of being a prime number, is generated. Subsequently, a check is made as to whether the integer is a prime number.

FIG. 1 is a flow chart which includes steps for generating a prime number candidate in accordance with the prior art. As shown in this figure, at step 410, an integer X (pseudo-random-number) of n-bit (n is a positive integer) is generated at random. If the integer is an even number, the integer is apparently not a prime number. Further, there is the case where the integer X is not n-bit because the most significant bit is zero. Therefore, at step 420, each of the most and least significant bits is rendered "1".

Subsequently, a positive integer j is rendered equal to 1 at step 430, after which a check is made to determine if X can be divided Pj. If X can be divided by Pj, the program goes to step 410. On the contrary, if X can not be divided by Pj, the routine goes to step 450 at which a check is made to determine if j=m. If j=m, the program is terminated. Otherwise (viz., if j≠m), the routine proceeds to step 460 at which j=j+1. Thereafter, the program returns to step 440. In the above, m is a predetermined positive integer, and $P_1$, $P_2$, ..., $P_m$ are small prime numbers which are different with each other.

If the integer X is generated in a manner mentioned above, the integer X does not have any of $P_1$, $P_2$, ..., $P_m$ as a real prime divisor. Accordingly, the probability of the integer X being a prime number is higher than the case where an n-bit integer generated at random is a prime number. Thus, it is possible to effectively obtain a prime number having a predetermined number of bits.

By way of example, known techniques of generating a prime number and typical public-key cryptography, are disclosed in a book entitled "Applied Cryptography" by Bruce Schneier, second edition, published by John Wiley & Sons, Inc, 1996.

However, it is known in the art that, in accordance with the prime number theorem, the probability of a randomly generated n-bit integer being a prime number is in the order of about 1/n. As a result, with the conventional technique, it is necessary to randomly generate about "n" integers in order to obtain one prime number. As mentioned above, a secret key is a prime number as large as several hundreds to several thousands of bits. Thus, in order to obtain one secret key, it is necessary to generate integers several hundreds to several thousands times. Further, each time such an integer is generated, the integer is divided after which a check is made to determine if the integer can be divided by Pj. Consequently, with the conventional technique, a very large number of calculations are inevitable and hence, a lot of time is consumed until a prime number candidate. Further, hardware of divider is necessary with the attendant result of expensive apparatus.

SUMMARY OF THE INVENTION

It is therefore an object of the present invention to provide a method of generating a pseudo-random-number and apparatus therefor, via which a prime number candidate is able to be obtain in a short time and at low costs.

In brief, the object is achieved by improved techniques wherein a generator produces randomly an integer A, which satisfies $0 \leq A < (P_1-1)(P_2-1) \ldots (P_m-1)$, in synchronism with a clock pulse applied via an input terminal 180, where each of $P_1$, $P_2$, ... $P_m$ is a prime number equal to or more than 2. A first calculator calculates an integer X, whose probability of being a prime number is high, using the integer A based on equation $X = a_1(P_1P_2 \ldots P_m/P_1)B_1 + a_2(P_1P_2 \ldots P_m/P_2)B_2 + a_m(P_1P_2 \ldots P_m/P_m)B_m (\bmod P_1P_2 \ldots P_m)$. In this case, $a_k$ (k=1, 2, ..., m) is an integer which satisfies congruence equation $a_k(P_1P_2 \ldots P_m/P_k) = 1 \pmod{P_k}$, while $B_k$ represents $\{A \bmod (P_k-1)\}+1$. An adder outputs the integer X as an integer with a predetermined number of bits.

One aspect of the present invention resides in a method of generating pseudo-random-numbers, which comprises the steps of: random-number generating step for generating, using a pseudo-random-number generating means, a pseudo-random number A, which satisfies $0 \leq A < (P_1-1)(P_2-1) \ldots (P_m-1)$, based an inputted integer $(P_1-1)(P_2-1) \ldots (P_m-1)$, where m is a positive integer and each of $P_1$, $P_2$, ... $P_m$ is a prime number equal to or more than 2; first calculating step for calculating an integer X which is represented by $a_1(P_1P_2 \ldots P_m/P_1)B_1 + a_2(P_1P_2 \ldots P_m/P_2)B_2 + a_m (P_1P_2 \ldots P_m/P_m)B_m (\bmod P_1P_2 \ldots P_m)$, using dividing means, remainder calculating means, adding means, and multiplying means, where $D_k$ is a plurality of integers expressed by equation $D_k = D_{k-1}/(P_k-1)$ wherein $D_1 = A$ (k=1) and $2 \leq k \leq m$, wherein $B_k$ is a plurality of integers represented by $B_k = \{D_k \bmod (P_k-1)\}+1$ where k is a positive integer equal to or less than m, and wherein $a_k$ is a plurality of integers each of which satisfies congruence equation $a_k(P_1P_2 \ldots P_m/P_k)=1 \pmod{P_k}$; and second calculating step for generating an integer by adding said integer X to an integer $QP_1P_2 \ldots P_m$ using adding means wherein n is a positive integer, and Q is an integer which satisfies conditions of $2^{n-1} \leq QP_1P_2 \ldots P_m$ and $(Q+1) P_1P_2 \ldots P_m \leq 2^n$.

Another aspect of the present invention resides in a method of generating pseudo-random-numbers, which comprises the steps of: random-number generating step for generating respectively, using a plurality of pseudo-random-number generating means, a plurality of pseudo-random-numbers $A_k$, which satisfies $0 \leq A_k < (P_k-1)$, based an inputted plurality of integer $(P_1-1)(P_2-1) \ldots (P_m-1)$, where m is a positive integer, k being a positive integer equal to or less than m, and each of $P_1P_2 \ldots P_m$ is a prime number equal to or more than 2; first calculating step for calculating an integer X which is represented by $a_1(P_1P_2 \ldots P_m/P_1)B_1 + a_2(P_1P_2 \ldots P_m/P_2)B_2 + a_m(P_1P_2 \ldots P_m/P_m)B_m (\bmod P_1P_2 \ldots P_m)$, using remainder calculating means, adding means, and multiplying means, where $D_k$ is a plurality of integers expressed by equation $D_k = D_{k-1}/(P_k-1)$ wherein $D_1 = A$ (k=1) and $2 \leq k \leq m$, wherein $B_k$ is a plurality of integers represented by $D_k = \{D_k \bmod (P_k-1)\} + 1$ where k is a positive integer equal to or less than m, and wherein $a_K$ is a plurality of integers each of which satisfies congruence equation $a_k(P_1P_2 \ldots P_m/P_k) = 1 (\bmod P_k)$; and second calculating step for generating an integer by adding said integer X to an integer $QP_1P_2 \ldots P_m$ using adding means wherein n is a positive integer, and Q is an integer which satisfies conditions of $2^{n-1} \leq QP_1P_2 \ldots P_m$ and $(Q+1) P_1P_2 \ldots P_m \leq 2^n$.

Still another aspect of the present invention resides in an apparatus for generating pseudo-random-numbers, which comprises: random-number generating means for generating a pseudo-random number $A_1$ which satisfies $0 \leq A < (P_1-1)(P_2-1) \ldots (P_m-1)$, based an inputted integer $(P_1-1)(P_2-1) \ldots (P_m-1)$, where m is a positive integer and each of $P_1, P_2, \ldots P_m$ is a prime number equal to or more than 2; first calculating means, which includes dividing means, remainder calculating means, adding means, and multiplying means, for use in calculating an integer X which is represented by $a_1(P_1P_2 \ldots P_m/P_1)B_1 + a_2(P_1P_2 \ldots P_m/P_2)B_2 + + a_m(P_1P_2 \ldots P_m/P_m)B_m (\bmod P_1P_2 \ldots P_m)$, where $D_k$ is a plurality of integers expressed by equation $D_k = D_{k-1}/(P_k-1)$ wherein $D_1 = A$ (k=1) and $2 \leq k \leq m$, wherein $B_k$ is a plurality of integers represented by $D_k = \{D_k \bmod (P_k-1)\} + 1$ where k is a positive integer equal to or less than m, and wherein $a_K$ is a plurality of integers each of which satisfies congruence equation $a_k(P_1P_2 \ldots P_m/P_k) = 1 (\bmod P_k)$; and second calculating means for generating an integer by adding said integer X to an integer $QP_1P_2 \ldots P_m$ wherein n is a positive integer, and Q is an integer which satisfies conditions of $2^{n-1} \leq QP_1P_2 \ldots P_m$ and $(Q+1) P_1P_2 \ldots P_m \leq 2^n$.

Still another aspect of the present invention resides in an apparatus for generating pseudo-random-numbers, which comprises: a plurality of random-number generating means for generating respectively a plurality of pseudo-random-numbers $A_k$, which satisfies $0 \leq A_k < (P_k-1)$, based an inputted plurality of integer $(P_1-1)(P_2-1) \ldots (P_m-1)$, where m is a positive integer, k being a positive integer equal to or less than m, and each of $P_1, P_2, \ldots P_m$ is a prime number equal to or more than 2; first calculating means which includes remainder calculating means, adding means, and multiplying means, for use in calculating an integer X which is represented by $a_1(P_1P_2 \ldots P_m/P_1)B_1 + a_2(P_1P_2 \ldots P_m/P_2)B_2 + + a_m(P_1P_2 \ldots P_m/P_m)B_m (\bmod P_1P_2 \ldots P_m)$, where $D_k$ is a plurality of integers expressed by equation $D_k = D_{k-1}/(P_k-1)$ wherein $D_1 = A$ (k=1) and $2 \leq k \leq m$, wherein $B_k$ is a plurality of integers represented by $D_k = \{D_k \bmod (P_k-1)\} + 1$ where k is a positive integer equal to or less than m, and wherein $a_K$ is a plurality of integers each of which satisfies congruence equation $a_k(P_1P_2 \ldots P_m/P_k) = 1 (\bmod P_k)$; and second calculating means for generating an integer by adding said integer X to an integer $QP_1P_2 \ldots P_m$ wherein n is a positive integer, and Q is an integer which satisfies conditions of $2^{n-1} \leq QP_1P_2 \ldots P_m$ and $(Q+1) P_1P_2 \ldots P_m \leq 2^n$.

In connection with a given nonnegative integer $D_k$, the above mentioned integer $B_k$ represented by $\{D_k \bmod (P_k-1)\} + 1$ satisfies $0 < B_k < P_k$. If $0 < B_k < P_k$, $B \neq 0 \pmod{P_k}$. Therefore, if the numbers $P_1, P_2, \ldots P_m$ are different prime numbers with each other, there exists a solution of linear congruence equation $X = B_1 \pmod{P_1}$, $X = B_2 \pmod{P_2}$, $X = B_m \pmod{P_m}$. In this case, assuming that the solution is X (the above mentioned integer X), X can not be divided by any of $P_1, P_2, \ldots P_m$. That is, it leads to the fact that X does not have any of m small prime numbers $P_1, P_2, \ldots P_m$ as a real prime divisor. Thus, the probability of X being a prime number becomes higher than the probability of an integer randomly generated being a prime number.

It is known that the solution X of the aforesaid linear congruence equation can be given without difficulty by $X = a_1(P_1P_2 \ldots P_m/P_1)B_1 + a_2(P_1P_2 \ldots P_m/P_2)B_2 + \ldots + a_m(P_1P_2 \ldots P_m/P_m)B_m (\bmod P_1P_2 \ldots P_m)$. In the method of and apparatus for generating pseudo-random-numbers according to the present invention wherein a single pseudo-random-number A is first generated, the integer X is calculated at the above mentioned first calculating step and first calculating means.

Further, at the aforesaid second calculating step and second calculating means, $QP_1P_2 \ldots P_m$ is added to the integer X, and thus, an n-bit integer is obtained as a final output.

In the method of and apparatus for generating pseudo-random-numbers according to the present invention wherein a plurality of pseudo-random-numbers $A_k$ are first generated, pseudo-random-numbers $A_k$, which correspond to the above mentioned $D_k \bmod P_k-1$, are produced at the random-number generating step and random-number generating means. At the first calculating step and the first calculating means, the integer X is calculated using the pseudo-random-numbers $A_k$, after which at the second calculating step and the second calculating means, an n-bit integer is produced in a manner similar to the above mentioned invention.

BRIEF DESCRIPTION OF THE DRAWINGS

The features and advantages of the present invention will become more clearly appreciated from the following description taken in conjunction with the accompanying drawings in which like-elements are denoted by like reference numerals and in which.

DETAILED DESCRIPTION OF THE PREFERRED EMBODIMENTS

Figure 1:
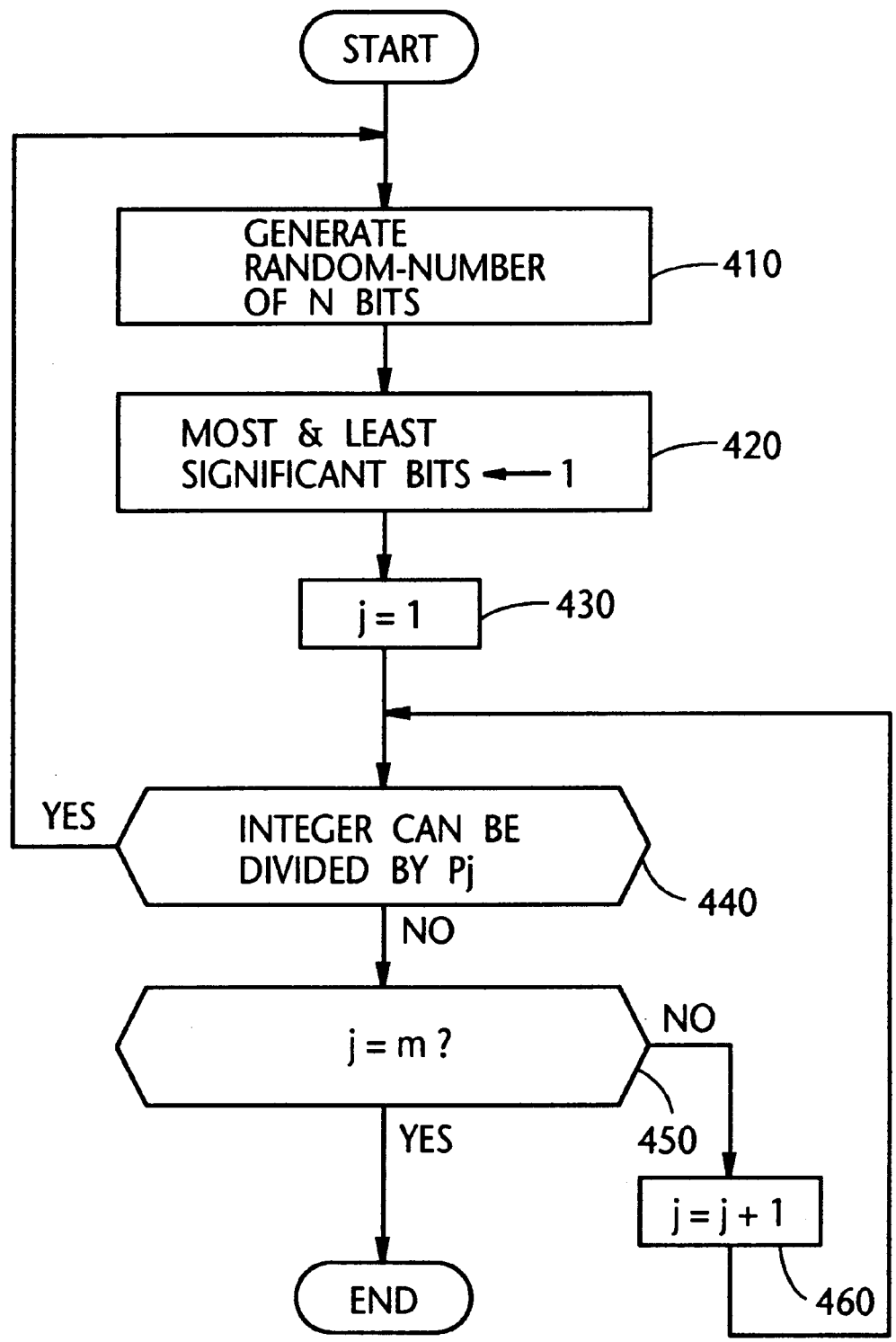
FIG. 1 is a flow chart which shows steps according to a conventional technique for generating a pseudo-random-number.

A first embodiment of the present invention will be described with reference to FIG. 2. In brief, the arrangement (or apparatus) shown in FIG. 2, generally depicted by reference numeral 2, is to produce a prime number candidate which will be treated as a secret key of a public-key cryptography or cryptosystem. As shown, the apparatus 2 generally comprises a random-number generator 101, a first calculator 4, and an adder 107 which functions as a second calculator. More specifically, the first calculator 4 is comprised of a plurality of dividers $102_1, 102_2, \ldots, 102_m$, a plurality of adders $103_1, 103^2, \ldots, 103_m$, a plurality of multipliers $104_1, 104_2, \ldots, 104_m$, an adder 105, and a remainder calculator 106.

The random-number generator 101 is supplied with a clock signal by way of an input terminal 180, and is also supplied with an integer $(P_1-1)(P_2-1) \ldots (P_m-1)$ via an input terminal 190. In the above, m is a positive integer, and each of $P_1, P_2, \ldots P_m$ is a prime number equal to or more than 2. The generator 101 produces a pseudo-random-number A, which satisfies $0 \leq A < (P_1-1)(P_2-1) \ldots (P_m-1)$, in synchronism with each clock pulse of the clock signal. The number A is applied to the first calculator 4.

The first calculator 4 operates such as to calculate, based on the following equation 1, an integer X (pseudo-random-number) whose probability of being a prime number is high.

$$X = a_1(P_1P_2 \ldots P_m/P_1)B_1 + a_2(P_1P_2 \ldots P_m/P_2)B_2 + a_m(P_1P_2 \ldots P_m/P_m)B_m (\bmod P_1P_2 \ldots P_m) \quad (1)$$

where $a_k$ (k=1, 2, ..., m) is an integer which satisfies congruence equation $a_k(P_1P_2 \ldots P_m/P_k) \equiv 1 \pmod{P_k}$. In the above, $B_1, B_2, \ldots, B_k$ are integers whose values are determined by equation $B_k = \{D_k \bmod (P_k-1)\}+1$. Further, $D_1, D_2, \ldots, D_m$ are integers determined by $D_1 = A$ (at k=1) and $D_k = D_{k-1}/(P_{k-1}-1)$ (at k is equal to or larger than 2).

The integer X given by equation (1) is a number whose probability of being a prime number is high. The reason for this will be described in detail later.

Each of the divisors $102_k$ (k=1,2, ... m), which form part of the first calculator 4, receives an integer $(P_k-1)$ via a corresponding terminal $191_k$. Further, the divisor $102_1$ is supplied with the pseudo-random-number A from the random-number generator 101.

The divisor $102_1$ calculates a quotient $D_2 = A/(P_1-1)$ and a remainder given by (A mod $(P_1-1)$) when the integer A is divided by the integer $(P_1-1)$, and outputs the quotient and the remainder. Each of the other divisors $102_k$ (k=2, ..., m) is proved to calculate or determine a quotient $D_{k+1} = D_k/(P_k-1)$ and a remainder ($D_k$ mod $(P_1-1)$) when the integer $D_k$ outputted from a left-side divisor is divided by the integer $(P_k-1)$. The remainders produced from the divisor $102_k$ (k= 1,2, ..., m) are respectively applied to the corresponding adders $103_k$. Hereinafter, D is represented by A (viz., $D_1 = A$) merely for the convenience of description.

Each of the adders $103_k$ receives, in addition to the remainder from the corresponding divisor $102_k$, number "1" via an input terminal 192. Each adder $103_k$ adds "1" to the remainder $\{D_k \bmod (P_k-1)\}$ and applies the result, as $B_k$ $(=\{D_k \bmod (P_k-1)\}+1)$, to the corresponding multiplier $104_k$.

The multipliers $104_k$ are respectively supplied with the add results $B_k$ from the adder $103_k$ and the corresponding integers $a_k(P_1P_2 \ldots P_m/P_k)$. The multiplier $104_k$ produces a product of this integer and the add result $B_k$, and applies the multiplication result to the adder 105. In the above, $a_k$ is an integer which satisfies a congruence equation $a_k(P_1P_2 \ldots P_m/P_k) \equiv 1 \pmod{P_k}$.

The adder 105 sums up all the outputs of the multipliers $104_k$ and applies the add result to the remainder calculator 106. This calculator 106 is supplied with the add result and an integer $P_1P_2 \ldots P_m$ ($P_1, P_2, \ldots P_m$ is a prime number), calculating a remainder when the add result is divided by $P_1 P_2 \ldots P_m$ and applying the remainder as an integer X to the adder 107.

The adder 107 is supplied with the integer X from the remainder calculator 106 and also an integer $QP_1P_2 \ldots P_m$ which is obtained by multiplying the aforesaid $P_1P_2 \ldots P_m$ by an integer Q. The adder 107 adds these integers, and outputs an integer thus obtained (viz., a pseudo-random-number) as a prime number candidate for a secret key. In this case, Q is an integer which satisfies conditions of $2^{2-1} \leq QP_1P_2 \ldots P_m$ and $(Q+1) P_1P_2 \ldots P_m \leq 2^n$.

In the following, the operation of the pseudo-random-number generating apparatus 2 will be described.

The random-number generator 101, when supplied with a clock signal by way of an input terminal 180, produces randomly an integer A (pseudo-random-number) which satisfies $0 \leq A < (P_1-1)(P_2-1) \ldots (P_m-1)$ in synchronism with the clock pulse, and applies the same to the divisor $102_1$.

On the other hand, the divisor $102_1$ calculates a quotient $D_2 = A/(P_1-1)$ and a remainder (A mod $(P_1-1)$) when the integer A is divided by the integer $(P_1-1)$, and outputs the quotient and the remainder. Each of the other divisors $102_k$ (k=2, ..., m) calculates or determines a quotient $D_{k+1} = D_k/(P_k-1)$ and a remainder $D_k$ mod $(P_1-1)$ when the integer $D_k$ outputted from a left-side divisor is divided by the integer $(P_k-1)$, and the remainders thus produced are respectively applied to the corresponding adders $103_k$. Hereinafter, merely for the convenience of description, $D_1$ is represented by A (viz., $D_1 = A$).

Each of the adders $103_k$ adds "1", applied thereto via the input terminal $192_1$ to the remainder $\{D_k \bmod (P_k-1)\}$ from each of the remainder calculators $102_k$, and applies the result $B_k(=\{D_k \bmod (P_k-1)\}+1)$ to the corresponding multiplier $104_k$. The multipliers $104_k$ multiply the add result $B_k$ by corresponding integers $a_k(P_1P_2 \ldots P_m/P_k)$ applied via the input terminals $193_k$, and apply the multiplication result to the adder 105.

Subsequently, the adder 105 sums up all the outputs of the multipliers $104_k$ and applies the add result to the remainder calculator 106. This remainder calculator 106 calculates the remainder when the add result is divided by $P_1 P_2 \ldots P_m$, and applying the remainder as an integer X to the adder 107 (the remainder calculating step according to the present invention).

The adder 107 adds the integer $QP_1P_2 \ldots P_m$, applied thereto via the input terminal 195, to the integer X from the remainder calculator 106, and outputs an integer thus obtained (viz., a pseudo-random-number) as a prime number candidate for a secret key from the output terminal 196. The integer X, calculated based on equation (1), is an integer satisfying $0 \leq X < P_1P_2 \ldots P_m$, and hence the bit length of the integer X has not necessarily a predetermined number or n bits. However, the adder 107 operates such as to add the integer $QP_1P_2 \ldots P_m$ to the integer X, and accordingly, an n-bit integer can be obtained, wherein the integer Q satisfies the conditions of $2^{n-1} \leq QP_1P_2 \ldots P_m$ and $(Q+1) P_1P_2 \ldots P_m \leq 2^n$.

As a result, every time the clock pulse is applied to the random-number generator 101 via the input terminal 180, n-bit prime number candidates, each for a secret key in the public-key cryptography, are successively outputted at the output terminal 196.

In order to obtain a pseudo-random-number whose probability of being a prime number is higher, the value of "m" is preferably set to a value as large as possible under the condition that the value of Q exists.

There will be described how to introduce equation (1). Further, the reason why the integer X can be a prime number candidate will be discussed.

In connection with a given nonnegative integer $D_k$, the above mentioned integer $B_k$ represented by $B_k = \{D_k \bmod$ $(P_k-1)\}+1$ satisfies $0<B_k<P_k$. If $0<B_k<P_k$, $B\neq 0 (\mathrm{mod}\ P_k)$. Therefore, if the numbers $P_1, P_2, \ldots P_m$ are different prime numbers with each other, there exists a solution of linear congruence equation $X=B_1\ (\mathrm{mod}\ P_1)$, $X=B_2\ (\mathrm{mod}\ P_2)$, $X=B_m\ (\mathrm{mod}\ P_m)$. In this case, assuming that the solution is X (the above mentioned integer X), X can not be divided by any of $P_1, P_2, \ldots P_m$. That is, it leads to the fact that X does not have any of m small prime numbers $P_1, P_2, \ldots P_m$ as a real prime divisor. Thus, the probability of X being a prime number becomes higher than the probability of an integer randomly generated being a prime number.

It is known that the solution X of the aforesaid linear congruence equation can be given without difficulty by $$X=a_1(P_1P_2\ldots P_m/P_1)B_1+a_2(P_1P_2\ldots P_m/P_2)B_2+a_m(P_1P_2\ldots P_m/P_m)B_m(\mathrm{mod}\ P_1P_2\ldots P_m)$$

The first calculating means 4 calculate using the just mentioned equation (viz., equation 1).

According to the above mentioned embodiment, when the random-number generator produces one integer at random, the integer thus produced is used to produce, in accordance with the equation (1), an integer whose probability of being a prime number (viz., prime number candidate) is high. Accordingly, the prime number candidate can be obtained in a markedly short time duration compared with the prior art wherein a large number of integers are generated and subjected to the integer number selecting operation.

In addition, with the conventional technique, it is necessary to implement "dividing" to check to determine whether or not each generated integer is a prime number. The present invention is able to eliminate any dividing element or device and thus is able to achieve a low cost apparatus.

The adder 107 adds $QP_1P_2\ldots P_m$ to the integer X applied thereto from the remainder calculator 106. Therefore, the n-bit prime number candidates (pseudo-random-numbers) outputted from the adder 107 does not uniformly distribute over $\{2^{n-1}, \ldots, 2^n-1\}$ but over $\{QP_1P_2\ldots P_m, \ldots (Q+1)P_1P_2\ldots P_m\}$. Thus, although the n-bit prime number candidate is not statistically an Ideal pseudo-random-number, such a prime number candidate is sufficient if applied to obtain a secret key of the public-key cryptograph.

The second embodiment will be described with reference to FIG. 3. Reference numbers used in FIG. 2 are used to indicate like elements in FIG. 3 and the descriptions thereof will be omitted for brevity.

Figure 2:
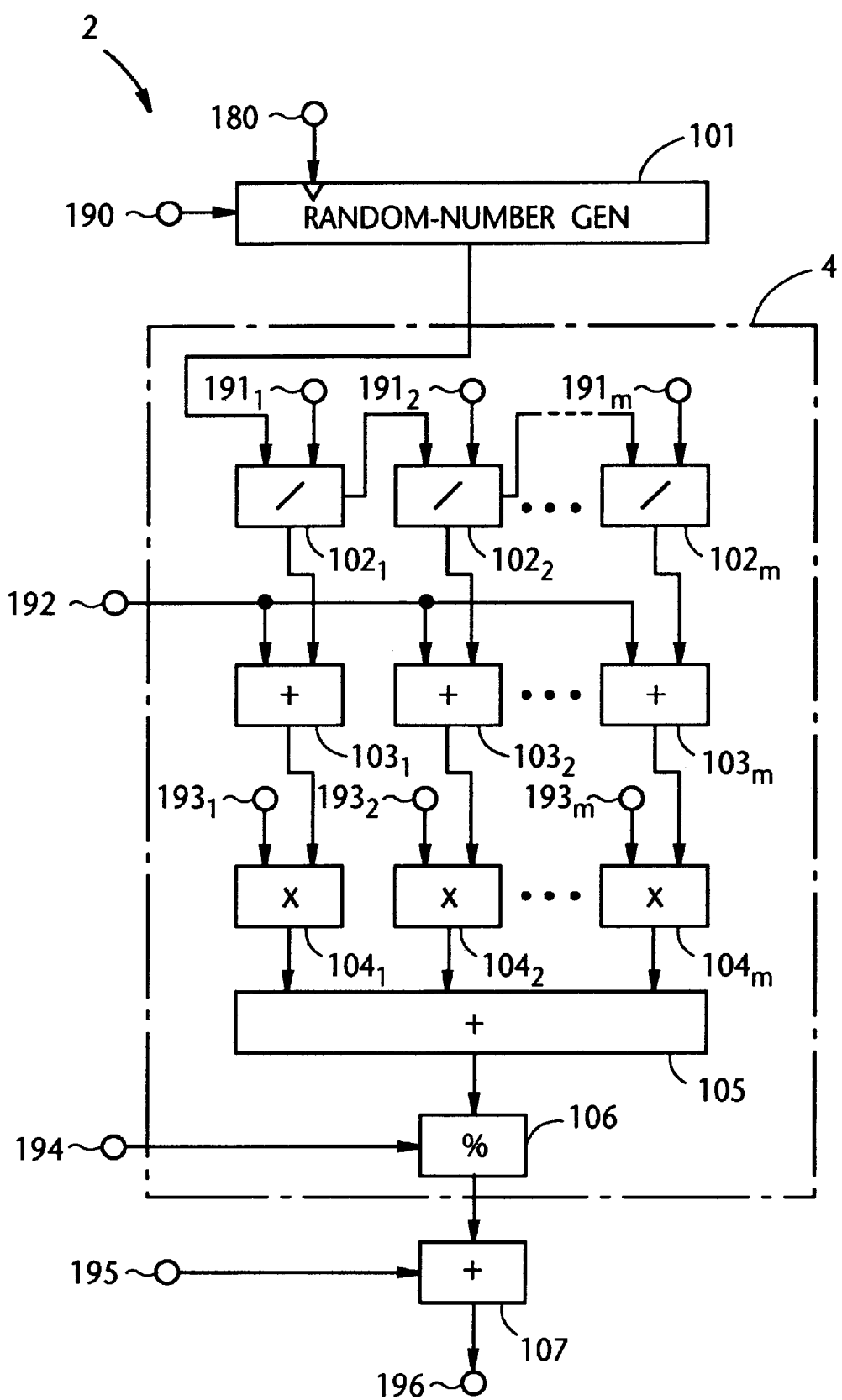
FIG. 2 is a block diagram schematically showing a first embodiment of the present invention.

A pseudo-random-number generator 6 differs, in terms of configuration, from the counterpart 2 of FIG. 2. That is, the random-number generator 101 of FIG. 2 is replaced with a plurality of random-number generators $201_k$, and a calculator 5, corresponding to the calculator 4 of FIG. 2, does not include the divisors $102_k$. Namely, the pseudo-random-number generator 6 is provided with a plurality of random-number generators $201_k$ respectively preceding the adders $103_k$. Each of the random-number generators $201_k$ receives a clock signal via an input terminal 180. Further, integers $(P_k-1)$ are respectively applied to the random-number generators $201_k$ via input terminals $290_k$. Further, each of the random-number generators $201_k$ generates, in response to the clock signal, a corresponding pseudo-random number $A_k$ which satisfies $0\leq A_k<(P_k-1)$. The numbers $A_k$ thus generated are respectively applied to the corresponding adders $103_k$.

With the pseudo-random-number generator 6, each random-number generator $201_k$ produces a pseudo-random-number $A_k$ which corresponds to an integer $\{D_k\ \mathrm{mod}\ (P_k-1)\}+1$ outputted from the $102_k$ of FIG. 2. The following blocks of FIG. 3 operate in exactly the same manner as those of FIG. 2, and thus, n-bit integers are produced as prime number candidates.

It is understood that the second embodiment is able to attain the same advantages as referred to in the first embodiment. In the second embodiment, although the number of random-number generators increases, m divisors can effectively be omitted. As a result, the second embodiment is able to produce prime number candidates in a further accelerated manner.

The third embodiment of the present invention will be described with reference to FIG. 4. As in the above, reference numbers used in FIG. 3 are also used to indicate like elements in FIG. 4, and the descriptions thereof will be omitted for brevity.

Figure 3:
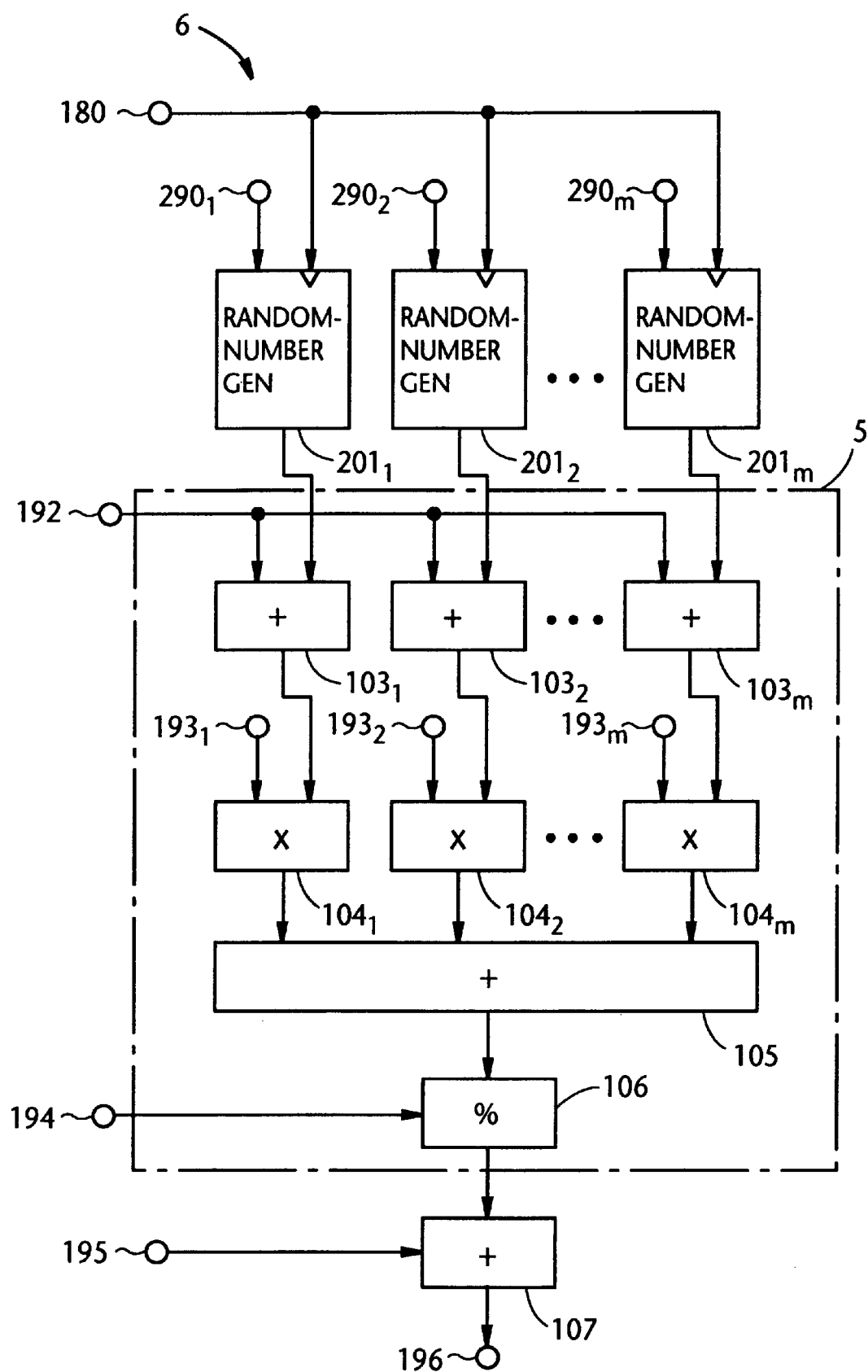
FIG. 3 is a block diagram schematically showing a second embodiment of the present invention.
Figure 4:
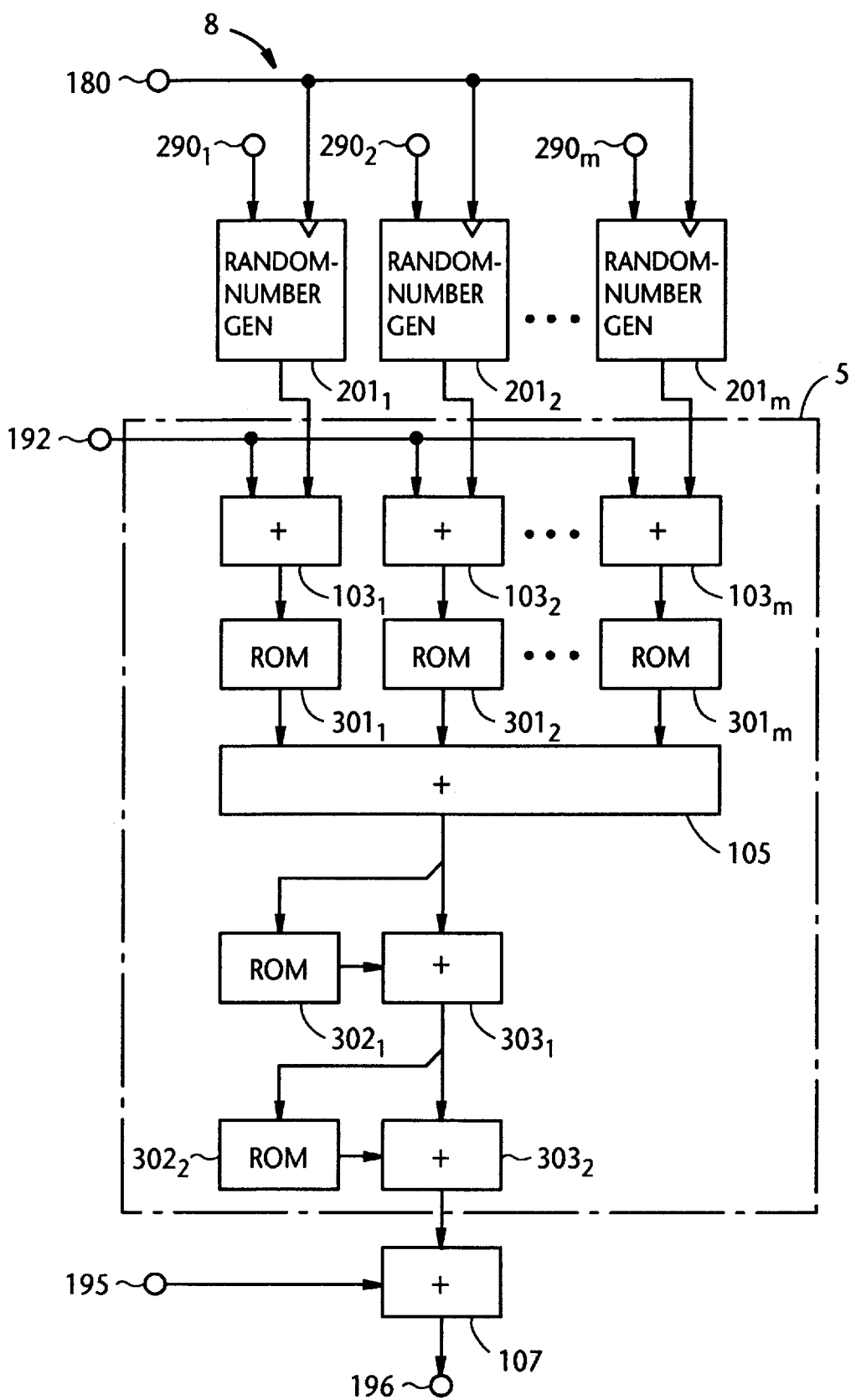
FIG. 4 is bock diagram schematically showing a third embodiment of the present invention.

A pseudo-random-number generator 8 of the third embodient differs from the counterpart 6 of FIG. 3. That is, the multipliers $104_k$ of FIG. 3 are respectively replaced with ROMs (Read Only Memories) $301_k$, and the remainder calculator 106 is replaced with adders $303_1$, $303_2$ and ROMs $302_1$ and $302_2$.

The adders $103_k$ respectively apply the add results thereof to address terminals of the ROMs $301_k$. These ROMs $301_k$ supply, via their data output terminals, the adder 105 with data stored therein. Each ROM $301_k$ has already stored an integer $a_k(P_1P_2\ldots P_m/P_k)$ at an address y (y is a nonnegative integer), and accordingly, each ROM $301_k$ is able to function in the same manner as each multiplier $104_k$. Further, each adder $103_k$ applies the integer $B_k$ to the corresponding ROM $301_k$. Since the value of $B_k$ is small and hence, the maximum value of the address of each M $301_k$ can be made small. This means that a ROM whose capacity is small can be used in the third embodiment.

On the other hand, lower n bits of the output of the adder 105 are applied to one input terminal of the adder $303_1$, while the remaining bits are applied to the address terminal of the ROM $302_1$. The output of the ROM $302_1$ is applied to the other input terminal of the adder $303_1$. Lower n bits of the output of the adder $303_1$ are applied to one input terminal of the adder $303_2$, while the remaining bits are applied to the address terminal of the ROM $302_2$. The output of the ROM $302_2$ is applied to the other input terminal of the adder $303_2$.

Each of ROMs $302_1$ and $302_2$ has stored, at address z (z is a nonnegative integer), an integer $2^n z\ (\mathrm{mod}\ P_1P_2\ldots P_m)$. Accordingly, the adders $303_1$, $303_2$ and the ROMs $302_1$ and $302_2$ have in combination the function of the remainder calculator 106 and thus, the integer X can be outputted from the adder $303_2$.

The integer z applied to each ROM $302_1$ and $302_2$ is "m" at the highest, and as the value of m is small. Thus, it is possible to use a ROM with a small capacity. Such a circuit configuration can be prepared without difficulty.

The third embodiment is able to attain the same advantages as the pseudo-random-number generating apparatus 6. The third embodiment does not use any multiplier and any remainder calculator. As a result, the third embodiment is able to produce prime number candidates with a high speed.

In the third embodiment, the multipliers and the remainder calculator of the second embodiment are replaced with the ROMs and the adders. This can be applied to the first embodiment. That is, the multipliers and the remaining calculator can be replaced with ROMs and adders, by which the operation can be implemented at a higher speed.

It will be understood that the above disclosure is representative of only few possible embodiments of the present invention and that the concept on which the invention is based is not specifically limited thereto.

What is claimed is:

1. A pseudo-random-number generating method comprising the steps of:

random-number generating step for generating, using a pseudo-random-number generating means, a pseudo-random number A, which satisfies $0 \leq A < (P_1-1)(P_2-1) \ldots (P_m-1)$, based an inputted integer $(P_1-1)(P_2-1) \ldots (P_m-1)$, where m is a positive integer and each of $P_1, P_2, \ldots P_m$ is a prime number equal to or more than 2;

first calculating step for calculating an integer X which is represented by $a_1(P_1P_2 \ldots P_m/P_1)B_1 + a_2(P_1P_2 \ldots P_m/P_2)B_2 + \ldots + a_m(P_1P_2 \ldots P_m/P_m)B_m (\bmod\ P_1P_2 \ldots P_m)$, using dividing means, remainder calculating means, adding means, and multiplying means, where $D_k$ is a plurality of integers expressed by equation $D_k = D_{k-1}/(P_k-1)$ where $D_1 = A$ (k=1) and $2 \leq k \leq m$, where $B_k$ is a plurality of integers represented by $D_k = \{D_k \bmod (P_k-1)\} + 1$ where k is a positive integer equal to or less than m, and where $a_K$ is a plurality of integers each of which satisfies congruence equation $a_k(P_1P_2 \ldots P_m/P_k) = 1 (\bmod\ P_k)$; and second calculating step for generating an integer by adding said integer X to an integer $QP_1P_2 \ldots P_m$ using adding means wherein n is a positive integer, and Q is an integer which satisfies conditions of $2^{n-1} \leq QP_1P_2 \ldots P_m$ and $(Q+1) P_1P_2 \ldots P_m \leq 2^n$.

2. A pseudo-random-number generating method as claimed in claim 1, wherein said first calculating step comprises the steps of:

dividing step for calculating, using dividing means, determining a quotient $D_{k+1} = D_k/(P_k-1)$ and a remainder $D_k \bmod (P_1-1)$ when the integer $D_k$ is divided by the integer $(P_k-1)$ where k is $D_1 = A$ and $2 \leq k \leq m$;

first adding step for calculating, using first adding means, said plurality of integers $B_k$ by adding 1 to each remainder obtained in said dividing step;

multiplying step for multiplying, using said multiplying means, each of the plurality of integers $B_k$, calculated in said first adding step, by a corresponding integer $a_k(P_1P_2 \ldots P_m/P_k)$;

second adding step for adding, using second adding means, all the multiplication results obtained in said multiplying step; and remainder calculating step for calculating, using a remainder calculating means, a remainder which is obtained by dividing the add result at said second adding step by the integer $P_1P_2 \ldots P_m$, and for generating the remainder as said integer X.

3. A pseudo-random-number generating method comprising the steps of:

random-number generating step for generating respectively, using a plurality of pseudo-random-number generating means, a plurality of pseudo-random-numbers $A_k$, which satisfies $0 \leq A_k < (P_k-1)$, based an inputted plurality of integer $(P_1-1)(P_2-1) \ldots (P_m-1)$, where m is a positive integer, k being a positive integer equal to or less than m, and each of $P_1, P_2, \ldots P_m$ is a prime number equal to or more than 2;

first calculating step for calculating an integer X which is represented by $a_1(P_1P_2 \ldots P_m/P_1)B_1 + a_2(P_1P_2 \ldots P_m/P_2)B_2 + \ldots + a_m(P_1P_2 \ldots P_m/P_m)B_m (\bmod\ P_1P_2 \ldots P_m)$, using remainder calculating means, adding means, and multiplying means, where $D_k$ is a plurality of integers expressed by equation $D_k = D_{k-1}/(P_k-1)$ wherein $D_1 = A$ (k=1) and $2 \leq k \leq m$, wherein $B_k$ is a plurality of integers represented by $D_k = \{D_k \bmod (P_k-1)\} + 1$ where k is a positive integer equal to or less than m, and wherein $a_K$ is a plurality of integers each of which satisfies congruence equation $a_k(P_1P_2 \ldots P_m/P_k) = 1 (\bmod\ P_k)$; and second calculating step for generating an integer by adding said integer X to an integer $QP_1P_2 \ldots P_m$ using adding means wherein n Is a positive integer, and Q is an integer which satisfies conditions of $2^{n-1} \leq QP_1P_2 \ldots P_m$ and $(Q+1) P_1P_2 \ldots P_m \leq 2^n$.

4. A pseudo-random-number generating method as claimed in claim 3, wherein said first calculating step comprises the steps of:

first adding step for calculating, using first adding means, said plurality of integers $B_k$ by adding 1 to each of said plurality of pseudo-random-numbers $A_k$ generated at said random-number generating step;

multiplying step for multiplying, using said multiplying means, each of the plurality of integers $B_k$, calculated in said first adding step, by a corresponding integer $a_k(P_1P_2 \ldots P_m/P_k)$;

second adding step for adding, using second adding means, all the multiplication results obtained in said multiplying step; and remainder calculating step for calculating, using a residue calculating means, a remainder which is obtained by dividing the add result at said second adding step by the integer $P_1P_2 \ldots P_m$, and for generating the remainder as said integer X.

5. A pseudo-random-number generating apparatus, comprising:

random-number generating means for generating a pseudo-random number A, which satisfies $0 \leq A < (P_1-1)(P_2-1) \ldots (P_m-1)$, based an inputted integer $(P_1-1)(P_2-1) \ldots (P_m-1)$, where m is a positive integer and each of $P_1, P_2, \ldots P_m$ is a prime number equal to or more than 2;

first calculating means, which includes dividing means, remainder calculating means, adding means, and multiplying means, for use in calculating an integer X which is represented by $a_1(P_1P_2 \ldots P_m/P_1)B_1 + a_2(P_1P_2 \ldots P_m/P_2)B_2 + \ldots + a_m(P_1P_2 \ldots P_m/P_m)B_m (\bmod\ P_1P_2 \ldots P_m)$, where $D_k$ is a plurality of integers expressed by equation $D_k = D_{k-1}/(P_k-1)$ wherein $D_1 = A$ (k=1) and $2 \leq k \leq m$, wherein $B_k$ is a plurality of integers represented by $D_k = \{D_k \bmod (P_k-1)\} + 1$ where k is a positive integer equal to or less than m, and wherein $a_K$ is a plurality of integers each of which satisfies congruence equation $a_k(P_1P_2 \ldots P_m/P_k) = 1 (\bmod\ P_k)$; and second calculating means for generating an integer by adding said integer X to an integer $QP_1P_2 \ldots P_m$ wherein n is a positive integer, and Q is an integer which satisfies conditions of $2^{n-1} \leq QP_1P_2 \ldots P_m$ and $(Q+1) P_1P_2 \ldots P_m \leq 2^n$.

6. A pseudo-random-number generating apparatus as claimed in claim 5, wherein said first calculating means comprises:

a plurality of dividing means for calculating, using dividing means, determining a quotient $D_{k+1} = D_k/(P_k-1)$ and a remainder $D_k \bmod (P_1-1)$ when the integer $D_k$ is divided by the integer $(P_k-1)$ where $D_1 = A$ (k=1) in connection with said pseudo-random-number A and wherein $2 \leq k \leq m$;

a plurality of first adding means for calculating respectively said plurality of integers $B_k$ by adding 1 to each remainder obtained in said first remainder calculating means;

a plurality of multiplying means for multiplying respectively each of the plurality of integers $B_k$, calculated using said first adding means, by a corresponding integer $a_k(P_1P_2\ldots P_m/P_k)$;

second adding means for adding all the multiplication results obtained in said multiplying means; and remainder calculating means for calculating a remainder which is obtained by dividing the add result at said second adding step by the integer $P_1P_2\ldots P_m$, and for outputting the remainder as said integer X.

7. A pseudo-random-number generating apparatus comprising:

a plurality of random-number generating means for generating respectively a plurality of pseudo-random-numbers $A_k$, which satisfies $0 \leq A_k < (P_k-1)$, based an inputted plurality of integer $(P_1-1)(P_2-1)\ldots(P_m-1)$, where m is a positive integer, k being a positive integer equal to or less than m, and each of $P_1, P_2, \ldots P_m$ is a prime number equal to or more than 2;

first calculating means which includes remainder calculating means, adding means, and multiplying means for use in calculating an integer X which is represented by $a_1(P_1P_2\ldots P_m/P_1)B_1 + a_2(P_1P_2\ldots P_m/P_2)B_2 + \ldots + a_m(P_1P_2\ldots P_m/P_m)B_m \pmod{P_1P_2\ldots P_m}$, where $D_k$ is a plurality of integers expressed by equation $D_k = D_{k-1}/(P_k-1)$ wherein $D_1 = A(k=1)$ and $2 \leq k \leq m$, wherein $B_k$ is a plurality of integers represented by $D_k = \{D_k \bmod (P_k-1)\}+1$ where k is a positive integer equal to or less than m, and wherein $a_K$ is a plurality of integers each of which satisfies congruence equation $a_k(P_1P_2\ldots P_m/P_k)=1 \pmod{P_k}$; and second calculating means for generating an integer by adding said integer X to an integer $QP_1P_2\ldots P_m$ wherein n is a positive integer, and Q is an integer which satisfies conditions of $2^{n-1} \leq QP_1P_2\ldots P_m$ and $(Q+1)P_1P_2\ldots P_m \leq 2^n$.

8. A pseudo-random-number generating apparatus as claimed in claim 7, wherein said first calculating means comprises:

first adding means for calculating respectively said plurality of integers $B_k$ by adding 1 to each of said plurality of pseudo-random-numbers $A_k$ generated at said random-number generating means;

a plurality of said multiplying means for multiplying each of the plurality of integers $B_k$, calculated by said first adding means, by corresponding integers $a_k(P_1P_2\ldots P_m/P_k)$;

second adding means for adding all the multiplication results obtained by said multiplying means; and remainder calculating means for calculating a remainder which is obtained by dividing the add result at said second adding means by the integer $P_1P_2\ldots P_m$, and for generating the remainder as said integer X.

9. A pseudo-random-number generating apparatus as claimed in claim 6 or 8, wherein said multiplying means is constructed by ROM.

10. A pseudo-random-number generating apparatus as claimed in claim 6 or 8, wherein said remainder calculating means comprises first and second ROMs, and first and second adders, and wherein a plurality of lower bits of the output data of said second adding means is applied to one input terminal of said first adding means, the remaining bits being applied to address terminals of said first ROM, and the output data of said first ROM being applied to the other input terminal of said first adding means, wherein a plurality of lower bits of the output data of said first adding means is applied to one input terminal of said second adding means, the remaining bits being applied to address terminals of said second ROM, and the output data of said second ROM being applied to the other input terminal of said second adding means, and wherein the output data of said second adding means is outputted as a calculating result of the remainder of said remainder-calculating means.

\* \* \* \* \*

UNITED STATES PATENT AND TRADEMARK OFFICE
CERTIFICATE OF CORRECTION

PATENT NO.: 6,141,668
DATED: October 31, 2000
INVENTOR(S): Michio SHIMADA

It is certified that error(s) appears in the above-identified patent and that said Letters Patent is hereby corrected as shown below:

Column 1, line 57, after "divided" insert --by--.

Column 5, line 7, delete "$103^2$" insert --$103_2$--;

line 35, delete "terminal$191_k$" insert --terminal $191_k$--;

line 38, after "$D_2$", insert --=--

Column 6, line 8, delete "$2^{2-1}$" insert --$2^{n-1}$--

Signed and Sealed this

Fifteenth Day of May, 2001

Attest:

NICHOLAS P. GODICI

*Attesting Officer*     *Acting Director of the United States Patent and Trademark Office*